United States Patent [19]

Tokumaru

[11] Patent Number: 4,474,459
[45] Date of Patent: Oct. 2, 1984

[54] OPTICAL PROJECTION SYSTEM
[75] Inventor: Hisashi Tokumaru, Osaka, Japan
[73] Assignee: Minolta Camera Kabushiki Kaisha, Osaka, Japan
[21] Appl. No.: 459,231
[22] Filed: Jan. 19, 1983
[30] Foreign Application Priority Data Jan. 20, 1982 [JP] Japan .................................. 57-7870
Jan. 20, 1982 [JP] Japan .................................. 57-7871
Jan. 25, 1982 [JP] Japan .................................. 57-10547

[51] Int. Cl.³ ...................... G03B 27/44; G03B 27/48; G03B 27/50
[52] U.S. Cl. .......................................... 355/46; 355/50
[58] Field of Search ...................... 355/1, 50, 46, 11, 8

[56] References Cited

U.S. PATENT DOCUMENTS

| | | | |
|---|---|---|---|
| 3,584,950 | 6/1971 | Gundlach et al. | 355/52 |
| 3,584,952 | 6/1971 | Gundlach et al. | 355/52 |
| 3,592,542 | 7/1971 | Kaufer et al. | 355/50 |
| 3,605,593 | 9/1971 | Anderson | 355/50 X |
| 3,655,284 | 4/1972 | Agliata | 355/50 X |
| 4,168,900 | 9/1979 | Adachi | 355/1 |
| 4,173,411 | 11/1979 | Massengeil et al. | 355/50 |
| 4,215,933 | 8/1980 | Feneberg et al. | 355/50 |
| 4,417,809 | 11/1983 | Nötzel et al. | 355/46 |

FOREIGN PATENT DOCUMENTS 2905740 2/1979 Fed. Rep. of Germany .

Primary Examiner—Richard A. Wintercorn
Attorney, Agent, or Firm—Jackson, Jones & Price

[57] ABSTRACT

An optical projection system of unit magnification for transmitting a real erect image of an object from an object plane to an image plane, comprises a plurality of lenses having parallel optical axes and being arranged in one or more rows. Each lens comprises three or four lens elements arranged along a common optical path extending between the object and image planes, and includes at least two aperture masks which subtend light rays from the axial and off-axis object points in the object plane. These aperture masks are arranged in positions where the image-forming pencil of light rays passing through the lens has a relatively large cross-section.

18 Claims, 17 Drawing Figures

OPTICAL PROJECTION SYSTEM

BACKGROUND OF THE INVENTION

1. Field of the Invention

The present invention relates to an optical projection system and, more particularly, to an optical system of unit magnification for transmitting an erect real image of an object from an object plane onto an image plane.

2. Description of the Prior Art

Examples of such an optical projection system have been found in various machines, for example, in copying machines of the kind wherein a copy of an original is produced during a transfer step which causes the transfer of a developed image from a photosensitive plate or drum to a copy paper. The optical projection system employed in the early copying-machines of the kind consists of a single lens device which projects the entire image of an object at a time on the image plane. A disadvantage of that system is that in order to obtain good images free from the aberrations it must have a relatively long focal length and therefore requires a relatively long track length between the object and the image planes, resulting in the increase in size of the copying-machines.

With increasing demand for compact copying-machines, there have been proposed various optical projection systems of the kind wherein a plurality of lenses with a short focal length are arranged in one or more rows to scan strip-shaped portions of an object in the object plane and to project images of the scanned strip-shaped image elements onto the successive image plane where a complete image of the scanned object is formed.

For example, U.S. Pat. Nos. 3,584,950 and 3,584,952 (corresponding to Japanese patent publication No. Sho49-8893) discloses an optical projection system comprising a plurality of optical imaging devices, each of which comprises three separated lens elements, i.e., the first lens element arranged nearer to the object plane to form an inverted real image on an intermediate image plane, the second lens element arranged in the intermediate image plane to prevent the imaging device from experiencing any loss of image light rays, and the third lens element arranged nearer to the image plane to transmit and invert the intermediate image onto the image plane. In such a system, the image rays projected by the adjoining imaging devices are slightly overlapped by one another to reduce the unevenness of exposure and, the size of an elemental area to be scanned at one time by each imaging device is defined by an aperture plate adjacent to the second lens element.

Optical projection systems similar to those of the above U.S. patents are disclosed in DT-OS No. 29 05 740 and U.S. Pat. No. 3,592,542.

Also, U.S. Pat. No. 4,215,933 discloses a projection system comprising a plurality of unsymmetrical lenses each comprising three lens elements and a lens-aperture plate arranged in an intermediate plane.

These projection systems have advantages in that they produce compact copying-machines because of their very short focal length and in that they can be constructed by plural lenticular bars each comprising a plurality of lenticular elements. It is, however, difficult to obtain good quality of copies with these projection systems. Because, the lens-aperture plate is located in a position adjacent to the second lens element or in the intermediate image plane where all the image light rays are gathered, so that the light exposure on the image plane is greatly affected by an error in measurement in making the lenses, particularly, by an error in size and disposition of the aperture plate. The deviation of exposure due to that error reaches at least several percent in spite of the fact that the allowable deviation of exposure in the copying machines is less than a few percent. As a result, the ultimate copy obtained exhibits bright and dark streaky images extending in the direction parallel to the scanning direction, resulting in a considerable decrease in the quality of the copy.

It is therefore a general object of the present invention to provide an improved optical projection system with a very short focal length that avoids the above drawbacks and minimizes the unevenness of exposure.

Another object of the present invention is to provide an improved optical projection system of unit magnification that has a construction format of great advantage to manufacturing.

According to the present invention, there is provided an optical projection system of unit magnification for transmitting a real erect image of an object from an object plane to an image plane, that comprises a plurality of lenses having parallel optical axes and being arranged in one or more rows, each of said lenses comprising three lens elements arranged along a common optical path extending between the object and image planes, the first lens element nearer to the object plane being adapted to form an inverted intermediate image upon an intermediate image plane, the second lens element being arranged at or near the intermediate plane to prevent the lens from experiencing the loss of light rays, the third element nearer to the image plane being adapted to transmit and invert the intermediate image on the image plane, characterized in that each of said lenses includes two aperture masks which subtend light rays from the axial and off-axis object points in the object plane, one of said aperture masks being arranged between the first and second lens elements and at a position closer to the first lens element and farther from the second lens element, the other mask being arranged between the second and third lens elements and at a position closer to the third lens element and farther from the second lens element.

In a preferred embodiment of the present invention, the above lenses are so designed that they have a magnification of an intermediate image ranging from $-0.25\times$ to $-0.6\times$.

According to another feature of the present invention, there is provided an optical projection system of unit magnification for transmitting an erect real image from an object plane to an image plane, comprising a plurality of lenses having parallel optical axes and being arranged in one or more rows, each of said lenses comprising four lens elements arranged along a common optical path extending between the object and image planes, said lens elements being classified into two groups which are symmetric with respect to an intermediate image plane, the first groups consisting of two lens elements on the side of the object plane and forming a real inverted intermediate image of the object on the intermediate plane, the second group consisting of two lens elements on the side of the image plane and transmitting and inverting the intermediate image on the image plane, characterized in that each of said lenses includes at least two aperture masks which subtend light rays from the axial and off-axis object points in the object plane, one of said aperture masks being arranged between two lens elements of said first group, the other being arranged between two lens elements of said second group.

In one preferred embodiment of the above projection system, the above lenses comprising four lens elements are so designed that they have a magnification of an intermediate image ranging from $-0.3\times$ to $-0.7\times$.

According to a further feature of the present invention there is provided a projection system of unit magnification for transmitting an erect real image from an object plane to an image plane, comprising a plurality of lenses having parallel optical axes and being arranged in one or more rows, each of said lenses comprising four lens elements arranged along a common optical path extending between the object and the image planes, said lens elements being classified into two groups which are symmetric with respect to an intermediate plane, the first group consisting of two lens elements on the side the object plane and forming a real inverted image of the object on the intermediate plane, the second group consisting of two lens elements on the side of the intermediate image plane and transmitting and inverting the intermediate image on the image plane, characterized in that each of said lenses includes two aperture masks which subtend light rays from the axial and off-axis object points, one of said aperture masks being arranged in front of the first group, the other mask being arranged at the back of the second group.

In one preferred embodiment of the above projection system, the above lenses comprising four lens elements are so designed that they have a magnification of an intermediate image ranging from $-0.35\times$ to $-0.7\times$.

In the above three types of the projection system of the present invention, the lens element may be made of a synthetic plastic material or conventional optical glass. In a preferred embodiment, the lenses are constructed by plural lenticular sheets each including a plurality of lenticular elements arranged in one or more rows. The lens elements may be so designed that they have refracting surfaces, of which all the radii of curvature are numerically equal.

In another preferred embodiment of the present invention, the above lenses are arranged in two or more parallel rows so that the lenses in one row are shifted by a distance equal to one-half of the distance between the neighboring optical axes of any two of the lenses in the neighboring row.

These and other objects, features and advantages of the present invention will be further apparent from the following description taken in conjunction with examples and the accompanying drawings.

DESCRIPTION OF THE PREFERRED EMBODIMENTS

Figure 1:
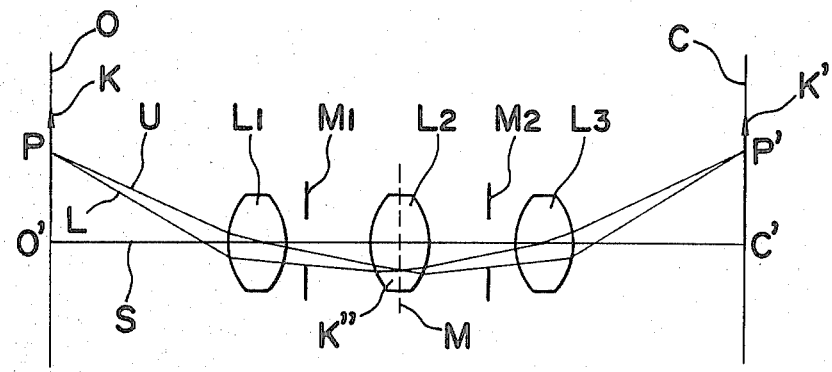
FIG. 1 is a schematic sectional view of one of the lens system in an optical projection system according to the present invention.

Referring now to FIG. 1, there is shown one form of a combined lens in an optical projection system according to the present invention. The combined lens comprises three lens elements $L_1$, $L_2$ and $L_3$ arranged along a common optical axis with proper separations to form an erect imaging system of unit magnification. The first lens element, $L_1$, nearer to an object plane, O, serves to form a real inverted image of a portion of an object area in an object plane on an intermediate image plane, and the third lens element, $L_3$, nearer to an image plane, C, serves to transmit and invert the real intermediate image on the image plane C. The second lens element, $L_2$, arranged at the intermediate image plane serves to prevent the lens from the loss of light rays.

Each of the above combined lens includes two aperture masks $M_1$ and $M_2$. The mask $M_1$ is located between the first and the second lens elements $L_1$ and $L_2$ but nearer to the lens element $L_1$ rather than the center between the elements $L_1$ and $L_2$. The mask $M_2$ is located between the second and third lens elements $L_2$ and $L_3$ but nearer to the lens element $L_3$ rather than the center of two elements $L_2$ and $L_3$. The masks $M_1$ and $M_2$ prevent some of the light rays which proceed from an off-axis object point (P) from reaching the image point (P'), so that the light rays which proceed from the off-axis object point P in the object plane O and pass through the lens lies in the area defined by ray traces U and L in FIG. 1. Thus, the cross-sectional area of light rays which proceed from the axial and off-axis object points in the object plane are determined only by the effective aperture of the masks $M_1$ and $M_2$. This implies that the distribution curve of exposure varies in a geometrically similar form with the change in the size and location of the masks. On the other hand, since the masks $M_1$ and $M_2$ are located farther from the second lens element $L_2$, the effective aperture of the lens element $L_2$ is greater than the actual aperture of the masks. This implies that the lens has a wide field angle.

In a projection system comprising a plurality of lenses arranged in one or more rows, the exposure on image plane is greatly affected by the field angle of each component lens which is in turn affected by the magnification of the intermediate image. The greater the field angle, the greater the number of lenses that contribute to form the image at any point in the image plane if the magnification of the intermediate image is fixed. The increase of the number of the lenses that contribute to formation of images on any point results in the reduction of the unevenness of exposure and reduces the influence of the error in shape and location of each mask on the evenness of exposure.

When taking into account the unevenness of exposure and the effective aperture of the projection system, it is very important to appropriately define the magnification of the intermediate image. The smaller the magnification of the intermediate image, the wider the field angle of the individual lenses. If the magnification of intermediate image is small, the number of the lenses that contribute to the formation of images on any point in the image plane is large, thus making it possible to decrease the unevenness of exposure. However, the increase of the field angle of the lens makes it difficult to sufficiently correct the aberrations. As a result, the projection system is required to have a large F number to obtain images with good quality. On the other hand, the larger the magnification of the intermediate image, the smaller is the field angle of the lens. If the magnification of the intermediate image is large, the number of the lenses that contribute to the formation of the image at any point in the image plane become small. This causes an increase in the unevenness of exposure, although it enables the manufacturer to produce projection systems with a small F number and free from aberrations.

For the reasons mentioned above, the lens of FIG. 1 in a projection system of the present invention is so designed that it works at a magnification of the intermediate image ranging from $-0.25\times$ to $-0.6\times$.

Figure 2:
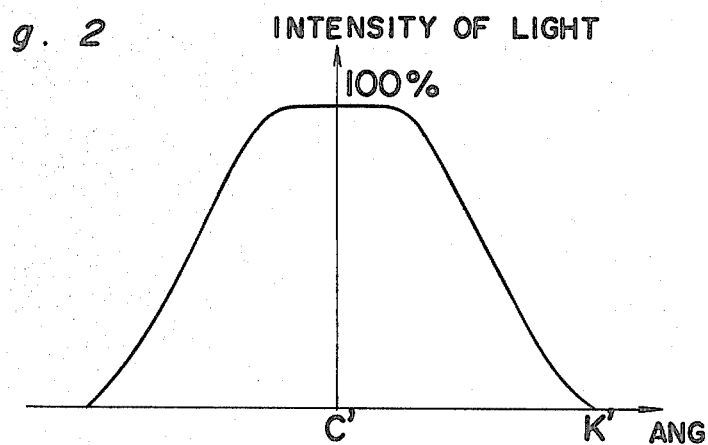
FIG. 2 is a diagram showing a typical form of a distribution curve of the intensity of light that reaches the image plane through the lens of FIG. 1.

FIG. 2 shows a typical distribution curve of the intensity of light that reaches the image plane C through the lens constructed as shown in FIG. 1 by three lens element $L_1$, $L_2$ and $L_3$, of which all the refracting surfaces have numerically equal radii of curvature, i.e., $r_1 = -r_2 = r_3 = -r_4 = r_5 = -r_6 = r$. In FIG. 2, the origin C' on the abscissa axis corresponds to the point of intersection, C', between the optical axis S and the image plane C in FIG. 1, and K' corresponds to the maximum field angle (K') in FIG. 1. Also, the intensity of light at the origin C' is set equal to 100%. As can be seen from this figure, the intensity of light is kept constant in a certain range that is defined by an angle which the principal ray through a certain image point makes with the optical axis, i.e., from zero to a certain angle, but decreases linearly in the range beyond that angle and then reaches zero at the angle K'. The angle at which the intensity of light begins to decrease is defined by the radius of the aperture of the masks $M_1$ and $M_2$.

In the projection system comprising the lens of FIG. 1, the slope of the distribution curve in the range beyond that angle can be reduced by leaving the masks $M_1$ and $M_2$ from the intermediate image plane. With decreasing the slope of the distribution curve, the number of the lenses that contribute to the formation of images on any point of the image plane increases. This implies that the influence of individual masks on any point in the image plane decreases with increase of the number of the lenses that contribute to the formation of images on that point. Thus, the unevenness of exposure may be reduced by leaving the masks from the intermediate image plane. In contrast therewith, if the masks $M_1$ and $M_2$ approaches the lens element $L_2$, the slope of the distribution curve increases and the number of the lenses that contribute to the formation of images on any point in the image plane decreases. This implies that errors in size or disposition of the masks have great influence on the uniformity of the exposure. For these reasons, the masks $M_1$ and $M_2$ in the lens of FIG. 1 are located in positions close to the first lens element $L_1$ and the third lens element $L_3$, respectively.

Figure 3:
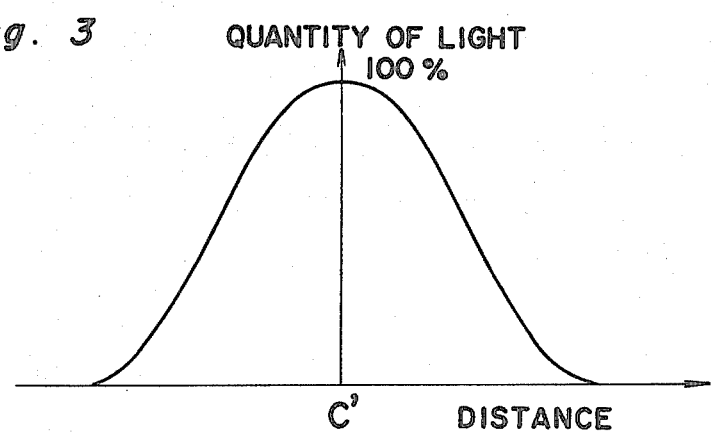
FIG. 3 is a diagram showing a typical form of a distribution curve of the exposure as a function of a distance taken from the axial point in the image plane for the lens of FIG. 1 in the longitudinal direction of a slit that is perpendicular to the scanning direction of the slit.

FIG. 3 shows a distribution of light exposure on the image plane when the object plane is scanned and projected on the image plane by the lens of FIG. 1.

Figure 4:
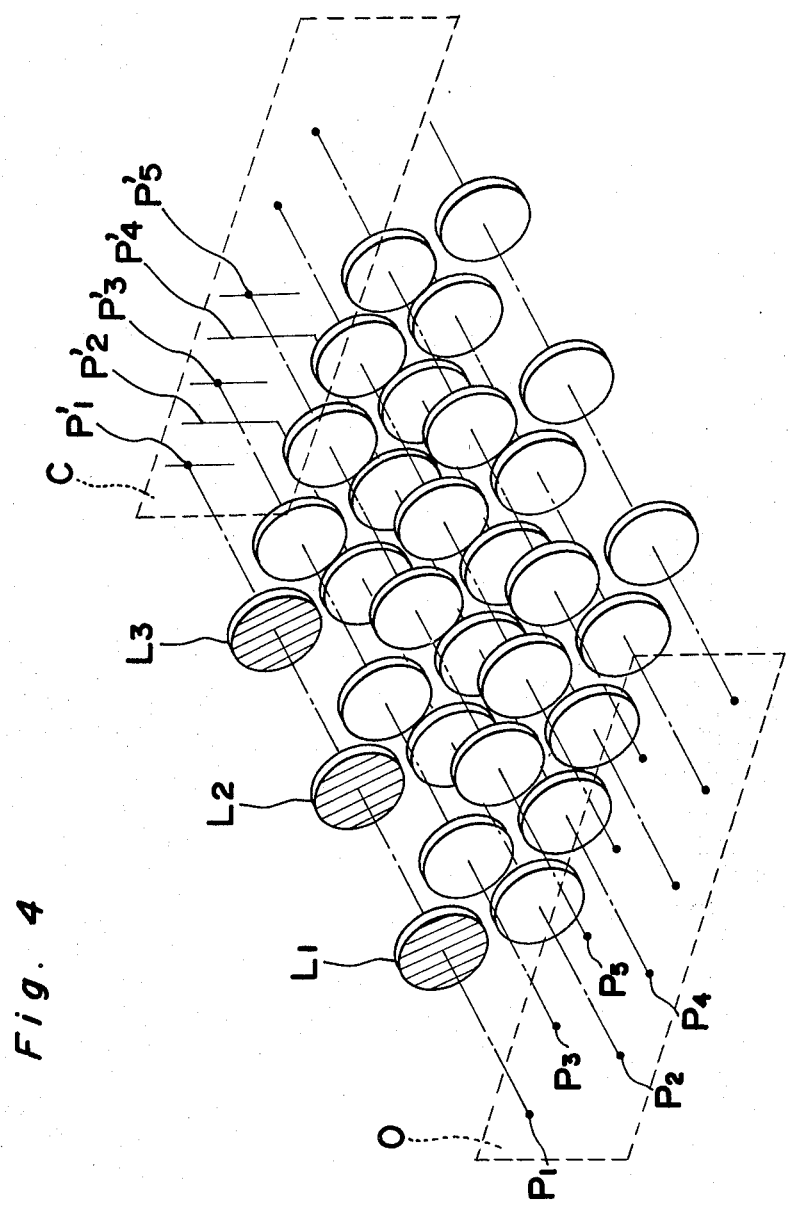
FIG. 4 is a schematic perspective view of an optical projection system embodying the present invention with the masks being removed.
Figure 5:
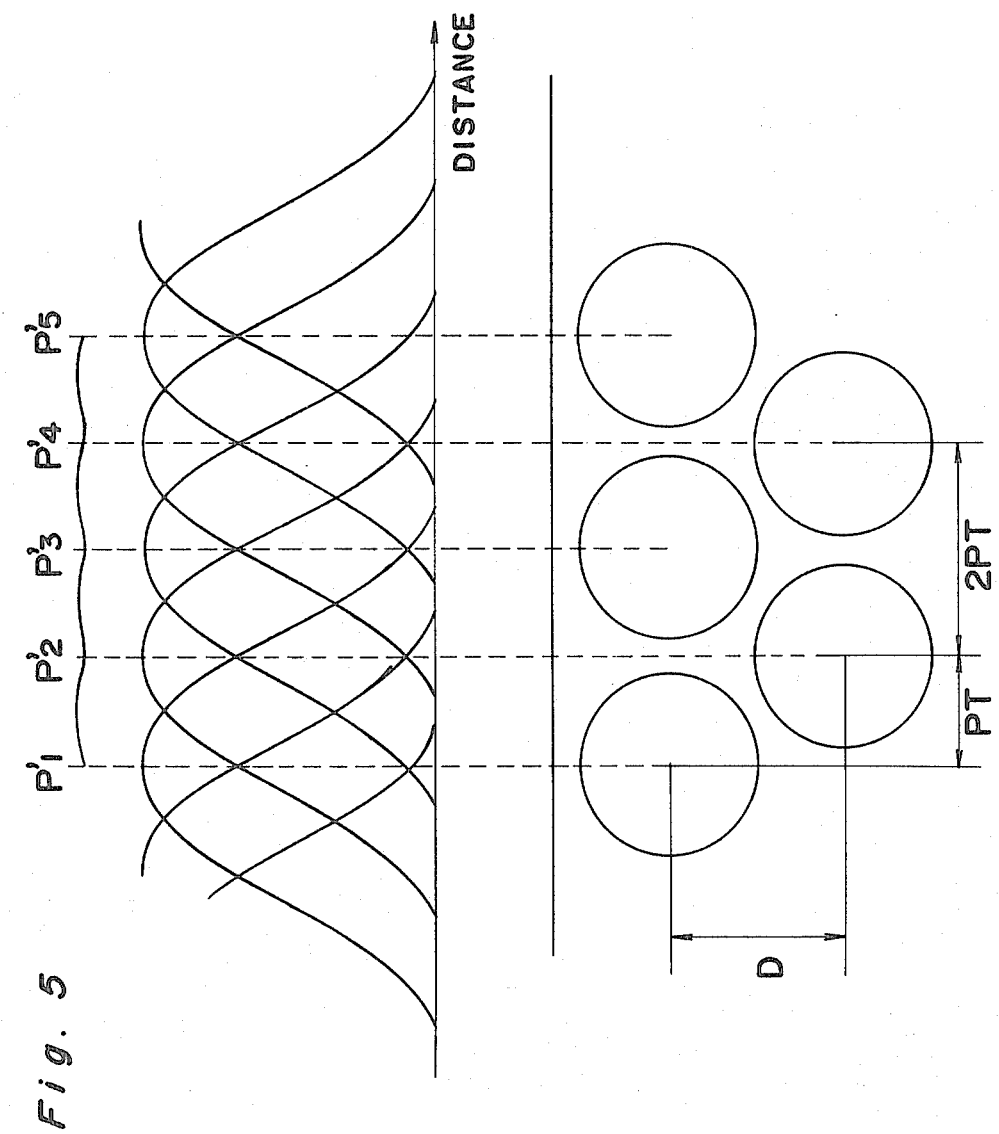
FIG. 5 is a diagram showing several distribution curves of exposure on the image plane for a plural lenses of FIG. 1 in a projection system according to the present invention, taken in the direction perpendicular to the scanning direction of a slit.

Referring now to FIGS. 4 and 5, there is shown a projection system according to the present invention that comprises a plurality of the lenses having a construction shown in FIG. 1. In FIG. 4, the masks are not shown for the clarification and better understanding of that figure. As shown in FIG. 5, the lenses are arranged in two rows extending in the longitudinal direction of a scanning slit (not shown) and in such a way that the second row is shifted by a distance, PT, equal to one-half of the distance, 2PT, between the parallel optical axes of any neighbouring two lenses in the first row. Broken lines show a strip-shaped area of the object plane O defined by the slit and a strip-shaped image area projected on the image plane C by the lenses. The distance, D, between the centers of two rows may take any value in proportion to the width of the slit. Also, FIG. 5 shows the distribution of light exposure on the image plane C that was obtained by scanning the object plane with the projection system of FIG. 4. From this figure, it can be seen that four or five lenses contribute to the formation of any point of the image points $P_1'$, $P_2'$ .... $P_5'$ in the image plane C and that the exposure is made uniform all over the image plane.

In the above example, the lenses are arranged in two rows but may be arranged in three or more rows in proportion to the width of the slit. Also, the projection system of the present invention may be constructed by a single row of the lenses. In any case, good optical performance can be obtained.

Figure 6:
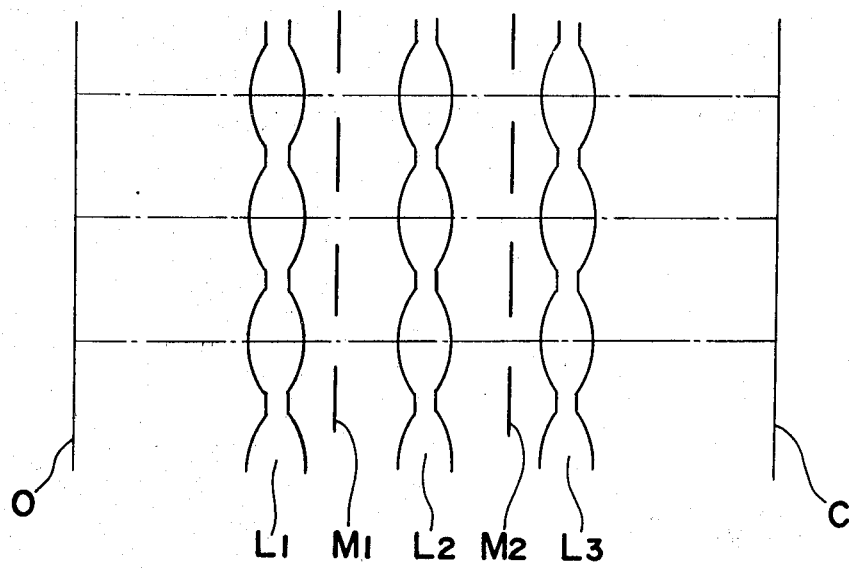
FIG. 6 is a schematic sectional view of a preferred embodiment of the projection system according to the present invention.

FIG. 6 shows another form of the projection system according to the present invention that comprises three elongated lenticular sheets each comprising two rows of lenticular elements $L_1$, $L_2$ or $L_3$, and two elongated aperture plates each comprising two rows of the corresponding aperture masks $M_1$ and $M_2$. These lenticular sheets and aperture plates are arranged in parallel one after the other such that two rows of optical systems of unit magnification are constructed by the corresponding lenticular elements $L_1$, $L_2$ and $L_3$ and aperture masks $M_1$ and $M_2$. The use of such lenticular sheets makes it possible to manufacture the projection systems with ease and to avoid complicated adjustment of the disposition of the respective lens elements.

The projection system shown in FIG. 6 may be assembled in the same manner as disclosed in DT-OS No. 2905740. In that case, the lenticular sheets are arranged parallel between a pair of housing members extending perpendicular to the optical axes of the lenses constructed by the cooperating lenticular elements of the sheets. A buffer sheet may be placed between the elongated end surfaces of the lenticular sheets and the housing member to prevent the lenticular sheets from movement in the direction of its width. To achieve the precise location of the lenticular sheets, each of the lenticular sheets is provided with a projection extending parallel to the optical axes in the middle of its elongated edge portion of the sheet. This projection is inserted into a recess provided in one of the housing members.

As will be understood from FIG. 6, the light rays incident upon any one lens may pass through the neighboring other lenses. Such unnecessary rays may be masked by placing opaque barrels (not shown) between the lens elements $L_1$ and $L_2$, and between the lens elements $L_2$ and $L_3$, respectively. The barrels may be so designed that they have a diameter slightly greater than that of the maximum image-forming pencil of the rays defined by two masks, thus making it easy to manufacture the same.

A projection system having a construction shown in FIG. 6 was produced by using three lenticular sheets, of which lens design parameters are set forth in Table 1.

TABLE 1

| | radius of curvature (mm) | axial distance (mm) | refractive index (for the e line) | material |
|---|---|---|---|---|
| $r_1$ | 6.253 | | | |
| | | $d_1$ 3.0 | $N_1$ 1.493 | acrylic resin |
| $r_2$ | −6.253 | | | |
| | | $d_2$ 7.4 | | |
| $r_3$ | 6.253 | | | |
| | | $d_3$ 3.0 | $N_2$ 1.493 | acrylic resin |
| $r_4$ | −6.253 | | | |
| | | $d_4$ 7.4 | | |
| $r_5$ | 6.253 | | | |
| | | $d_5$ 3.0 | $N_3$ 1.493 | acrylic resin |
| $r_6$ | −6.253 | | | |

The mask $M_1$ was placed behind the second refracting surface $r_2$ at a distance of 1 mm from that surface, while the mask $M_2$ was placed behind the fourth refracting surface at a distance of 6.4 mm from the fourth refracting surface. The effective aperture of these masks is 1.4 mm in diameter.

The effective F number of the resultant projection system is 12.2, and the track length between the object and image planes is 70.5 mm. The projection system possessed good optical performance and, the deviation of exposure on the image plane was only a few percent.

Figure 7:
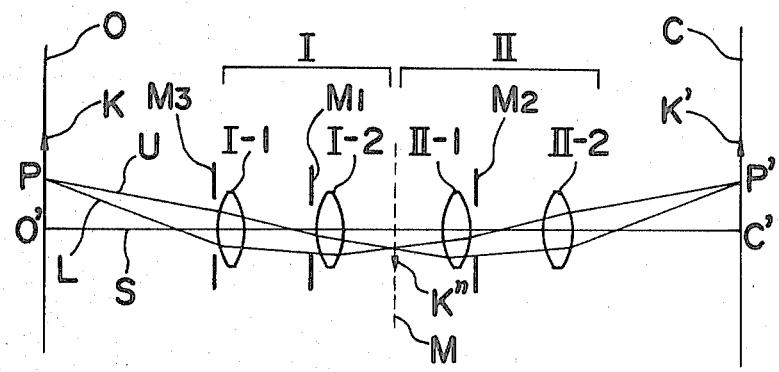
FIG. 7 is a schematic sectional view showing another in form of a lenses in the optical projection system according to the present invention.

Referring now to FIG. 7, there is shown another form of lenses in an optical projection system according to the present invention. The lens comprises four lens elements I-1, I-2, II-1 and II-2 arranged on a common optical axis with proper separations to form an erect imaging system of unit magnification. These lens elements may be classified into two lens element groups which are symmetric with respect to an intermediate plane M, i.e., the first group (I) consisting of two elements I-1, I-2 on the object side, and the second group (II) consisting of two lens elements II-1 and II-2 on the image side. The first group (I) nearer to an object plane, O, serves to form a real inverted image of a portion of the object area in the object plane on the intermediate image plane M, and the second element (II) nearer to an image plane, C, serves to transmit and invert the real intermediate image on the image plane C. The lens elements I-2 and II-1 serve as a field lens and contribute to correcting the aberrations and to preventing the lens from experiencing the loss of light rays. This arrangement enables the manufacturer to produce a projections system with good optical performance, particularly, low distortions, low astigmatism and a small F number.

The lens of FIG. 7 includes three aperture masks $M_1$, $M_2$ and $M_3$. The mask $M_1$ is located within the first lens element group (I), i.e., between the first and the second lens elements I-1 and I-2, while the mask $M_2$ is located within the second lens element group (II), i.e., between the third and fourth lens elements II-1 and II-2. The mask $M_3$ is arranged in front of the first lens element group (I), or the lens element I-1, to determine the cross-section of the image-forming pencil of the rays that proceed from an axial object point O' in the object plane O. The effective aperture of the mask $M_3$ determines the F number of each lens, but the mask $M_3$ is not necessarily required. The mask $M_1$ may be substituted for the mask $M_3$ with a result of an increased F number. The masks $M_1$ and $M_2$ prevent some of the light rays which proceed from an off-axis object point P from reaching the image point P', so that all the light rays which proceeds from the off-axis object point P in the object plane O and pass through the lens lie in the area defined by ray traces U and L in FIG. 7. Thus, the cross-sectional area of light rays which proceed from the axial and off-axis object points in the object plane are determined only by the effective aperture of the masks $M_1$ and $M_2$ as well as in the projection system of FIGS. 1 to 6. Since the masks $M_1$ and $M_2$ are located in positions where the image-forming pencil has a relatively large cross-section, the change in size or location of the masks does not have a large effect on the slope on the distribution curve and the exposure on the image plane.

The magnification of the intermediate image has a great influence on the evenness of exposure as well as in the lens of FIG. 1, so that the lens in the projection system of FIG. 7 is so designed that it works at a magnification of the intermediate image ranging from $-0.3\times$ to $-0.7\times$.

Figure 8:
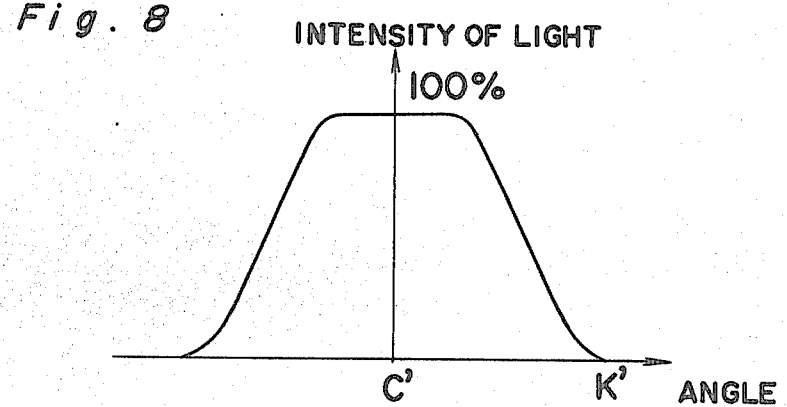
FIG. 8 is a diagram showing a distribution curve of the intensity of light that reaches the image plane through the lens of FIG. 7.

FIG. 8 shows a typical distribution curve of the intensity of light that reaches the image plane C through a lens that is constructed as shown in FIG. 7 by four lens elements I-1, I-2, II-1 and II-2, of which all the refracting surfaces have numerically equal radii of curvature, i.e., $r_1=-r_2=r_3=-r_4=r_5=-r_6=r_7=-r_8=r$. In this figure, the origin C' on the abscissa axis corresponds to the point of intersection, C', between the optical axis S and the image plane C in FIG. 7, and, K' corresponds to the maximum angle of view (K') in FIG. 7. Also, the intensity of light at the origin C' is set equal to 100%. As can be seen from this figure, the intensity of light is kept constant in a certain range that is defined by an angle which the principal ray through a certain image point makes with the optical axis, i.e., from zero to a certain angle, but decreases linearly in the range beyond that angle and then reaches zero at the angle K'. The angle at which the intensity of light begins to decrease is defined by the radius of the aperture of the masks $M_1$ and $M_2$. The slope of the distribution curve in the range beyond that angle can be reduced by leaving the masks from the intermediate image plane. When decreasing the slope of the distribution curve, the number of the lenses that contribute to the formation of images on any point of the image plane increases so that the unevenness of exposure may be reduced.

Figure 9:
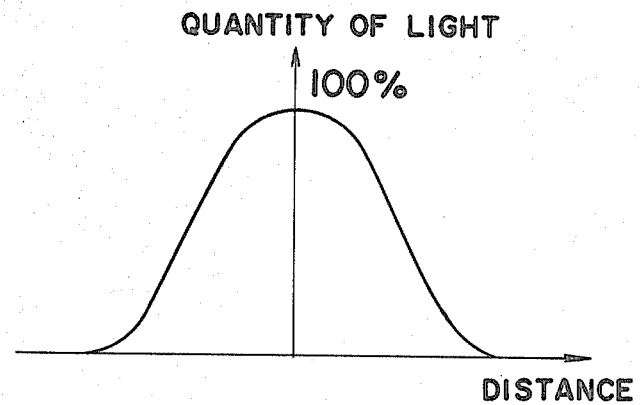
FIG. 9 is a diagram showing a distribution curve of exposure as a function of distance taken from the axial point in the image plane for the lens of FIG. 7 in the longitudinal direction of a slit that is perpendicular to the scanning direction of the slit.

FIG. 9 shows a distribution of light exposure on the image plane when the object plane is scanned and projected on the image plane by the lens described in conjunction with FIG. 8.

Figure 10:
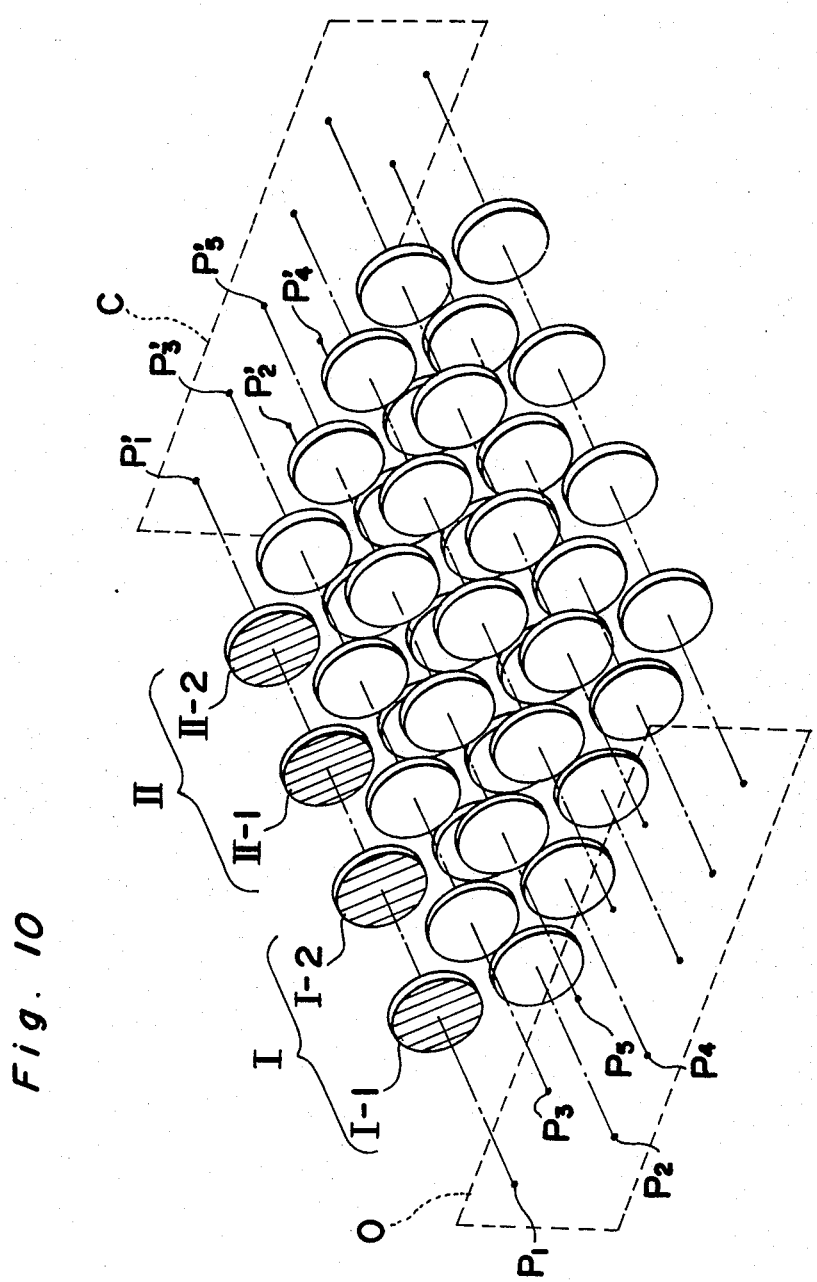
FIG. 10 is a schematic perspective view of another form of the optical projection system embodying the present invention with the masks being removed.
Figure 11:
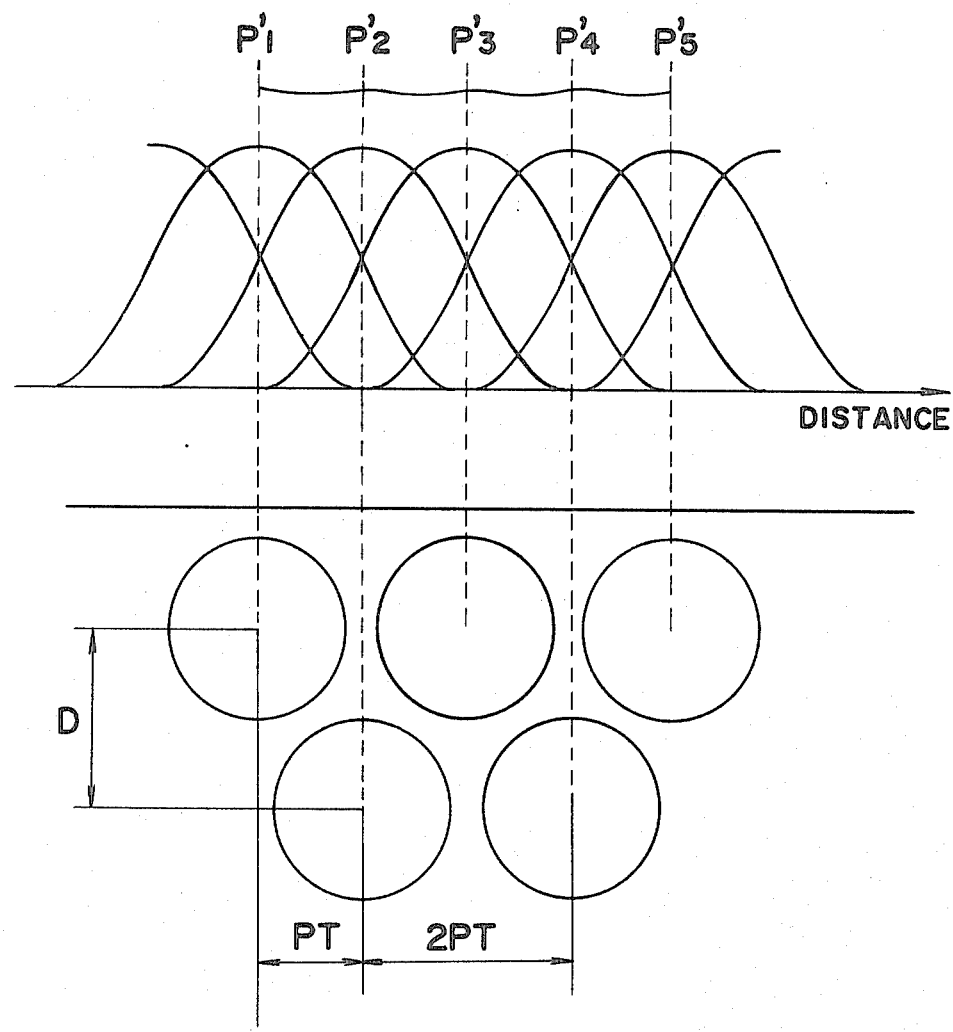
FIG. 11 is a diagram showing distribution curves of exposure, taken in the longitudinal direction of the slit, for several lenses in the projection system of FIG. 10.

Referring now to FIGS. 10 and 11, there is shown a projection system according to the present invention that comprises a plurality of the lenses having a construction as shown in FIG. 7. In FIG. 10, the masks are not shown for the simplification and better understanding of that figure. As shown in FIGS. 10 and 11, the lenses are arranged in two rows extending in the longitudinal direction of a scanning slit (not shown) and in such a way that the second row is shifted by a distance, PT, equal to one-half of the distance, 2PT, between the parallel optical axes of any neighbouring two lenses in the first row. Broken lines show a strip-shaped area of the object plane O defined by the slit and an image area projected on the image plane by the projection system. The distance, D, between the centers of two rows may take any value in proportion to the width of the slit. FIG. 11 also shows the distribution of light exposure on the image plane C that was obtained by scanning the object plane with the projection system of FIG. 10. From this figure it can be seen that three or four lenses contribute to the formation of any point of the image points $P_1'$, $P_2'$ .... $P_5'$ in the image plane C and that the exposure is approximately constant all over the image plane.

Figure 12:
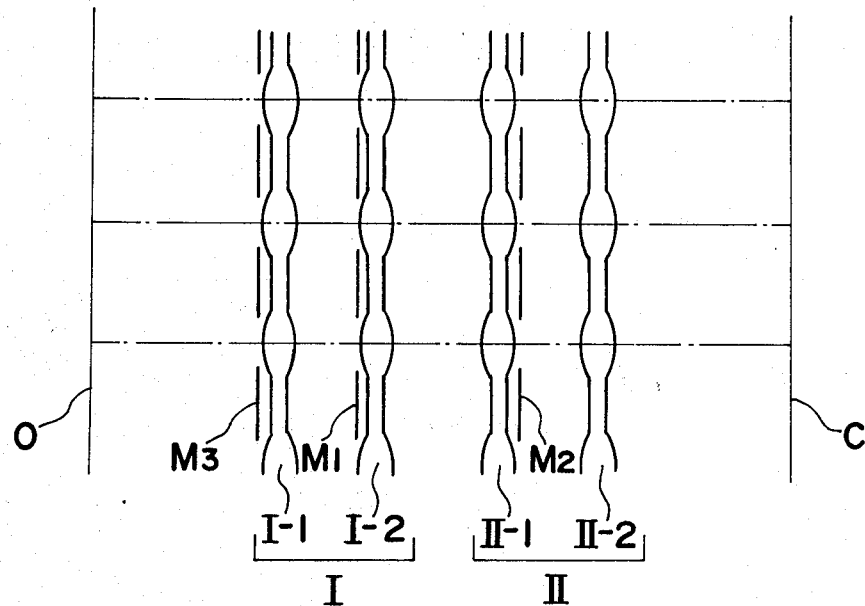
FIG. 12 is a schematic sectional view of another form of a projection system embodying the present invention.

FIG. 12 shows another form of projection system according to the present invention, comprising four lenticular sheets arranged one after the other. Each of the sheets comprises a plurality of lenticular elements I-1, I-2, II-1 or II-2 that are arranged in two rows. This projection system may be assembled in the same manner as the procedure for the projection system of FIG. 6.

A projection system having the construction shown in FIG. 12 was produced by using four lenticular sheets molded by acrylic resin, of which lens design parameters are set forth in Table 2.

TABLE 2

| radius of curvature (mm) | | axial distance (mm) | | refractive index (for the e line) | material |
|---|---|---|---|---|---|
| $r_1$ | 8.99 | | | | |
| | | $d_1$ | 3.0 | $N_1$ 1.493 | acrylic resin |
| $r_2$ | −8.99 | | | | |
| | | $d_2$ | 6.0 | | |
| $r_3$ | 8.99 | | | | |
| | | $d_3$ | 3.0 | $N_2$ 1.493 | acrylic resin |
| $r_4$ | −8.99 | | | | |
| | | $d_4$ | 7.6 | | |
| $r_5$ | 8.99 | | | | |
| | | $d_5$ | 3.0 | $N_3$ 1.493 | acrylic resin |
| $r_6$ | −8.99 | | | | |
| | | $d_6$ | 6.0 | | |
| $r_7$ | 8.99 | | | | |
| | | $d_7$ | 3.0 | $N_4$ 1.493 | acrylic resin |

TABLE 2-continued

| radius of curvature (mm) | | axial distance (mm) | refractive index (for the e line) | material |
|---|---|---|---|---|
| $r_8$ | −8.99 | | | |

The position of mask $M_1$ was in front of the third refracting surface $r_3$ at a distance of 0.2 mm, the mask $M_2$ being at the back of the sixth refracting surface $r_6$ at a distance of 0.2 mm, and the mask $M_3$ being in front of the first refracting surface $r_1$ at a distance of 0.2 mm. The effective aperture of each mask is 2.6 mm in diameter.

The effective F number of the resultant projection system is 6.9, and the track length between the object and image planes is 71.2 mm. The projection system possessed good optical performance and, the deviation of exposure on the image plane was a few percent.

Figure 13:
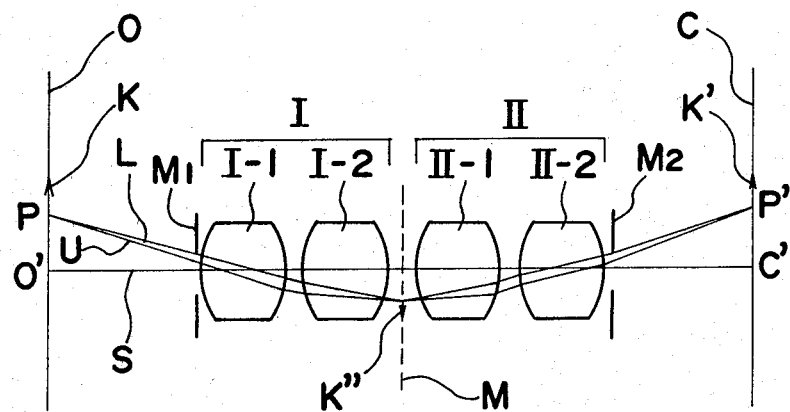
FIG. 13 is a schematic sectional view showing a further form of lenses in a optical projection system according to the present invention.

Referring to FIG. 13, there is shown another form of four element lenses in an optical projection system according to the present invention. This lens also comprises four lens elements I-1, I-2, II-1 and II-2 arranged on a common optical axis with proper separations to form an erect imaging system of unit magnification. These lens elements may be classified into two lens element groups symmetrically arranged with respect to an intermediate image plane M, i.e., the first group (I) consisting of two lens elements I-1, I-2 on the object side, and the second group (II) consisting of two lens elements II-1 and II-2 on the image side. The first group (I) nearer to an object plane, O, serves to form a real inverted image of a portion of the object area in the object plane on the intermediate image plane M, and the second element (II) nearer to an image plane, C, serves to transmit and invert the real intermediate image on the image plane C. The lens elements I-2 and II-1 contribute to correct the aberrations and serve as a field lens.

The lens shown in FIG. 13 includes two aperture masks $M_1$ and $M_2$. The mask $M_1$ is located in front of the first lens element group (I), while the mask $M_2$ is located at the back of the second lens element group (II). The masks $M_1$ and $M_2$ prevent some of the light rays which proceed from an off-axis object point P from reaching the image point P', so that all the light rays which proceed from the off-axis object point P in the object plane O and pass through the lens lie in the area defined by ray traces U and L in FIG. 13. Thus, the cross-sectional area of light rays which proceed from the axial and off-axis object points in the object plane O are determined only by the effective aperture of the masks $M_1$ and $M_2$. The above arrangement of the lenses and masks enables the manufacturer to produce a projection system with a very short conjugate of the order of 20 mm and a small effective F number of the order of 3.3, and to reduce the unevenness of exposure.

Even in a projection system comprising plural lenses of FIG. 13, the magnification of the intermediate image has a great influence on the evenness of exposure, so that each lens in the projection system of FIG. 13 is so designed that it works at a magnification of the intermediate image ranging from −0.35× to −0.7×.

Figure 14:
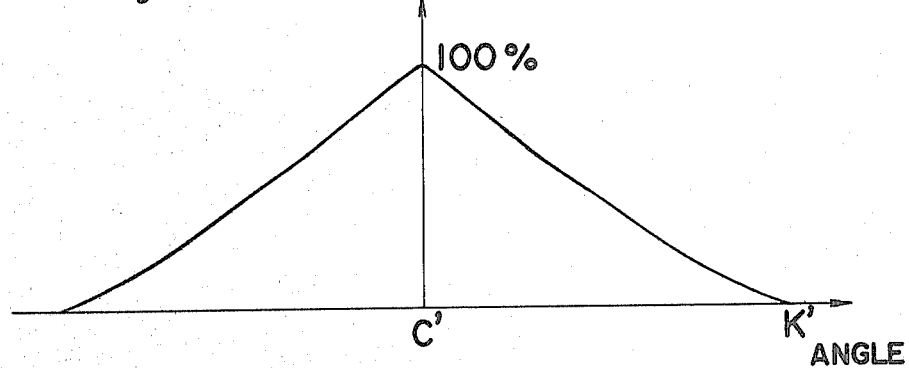
FIG. 14 is a diagram showing a typical form of a distribution curve of intensity of light that reaches the image plane through the lens of FIG. 13.

FIG. 14 shows a typical distribution curve of the intensity of light that reaches the image plane C through a lens being constructed as shown in FIG. 13 by four refracting lens elements I-1, I-2, II-1 and II-2, of which all the refracting surfaces have numerically equal radii of curvature, i.e., $r_1 = -r_2 = r_3 = -r_4 = r_5 = -r_6 = r_7 = -r_8 = r$. In this figure, the origin C' on the abscissa axis corresponds to the point of intersection, C', between the optical axis S and the image plane C in FIG. 13, and K' corresponds to the maximum angle of view (K') in FIG. 13. Also, the intensity of light at the origin C' is set equal to 100%. As can be seen from this figure, the intensity of light decreases linearly from the origin C' to the maximum field angle K'. In this system, the slope of the distribution curve can be reduced by leaving the masks from the intermediate image plane. With any decreasing of the slope of the distribution curve, the number of the lenses that contribute to the formation of images on any point of the image plane increases so that the unevenness of exposure may be reduced.

Figure 15:
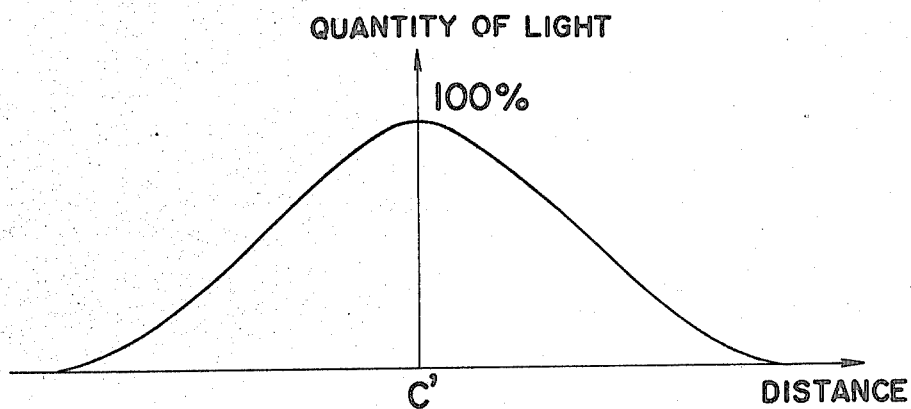
FIG. 15 is a diagram showing a distribution curve of exposure as a function of distance taken from the axial point in the image plane for the lens of FIG. 13 in the longitudinal direction of a slit that is perpendicular to the scanning direction of the slit.

FIG. 15 shows a distribution of light exposure on the image plane when the object plane is scanned and projected on the image plane by the lens of FIG. 13.

Figure 16:
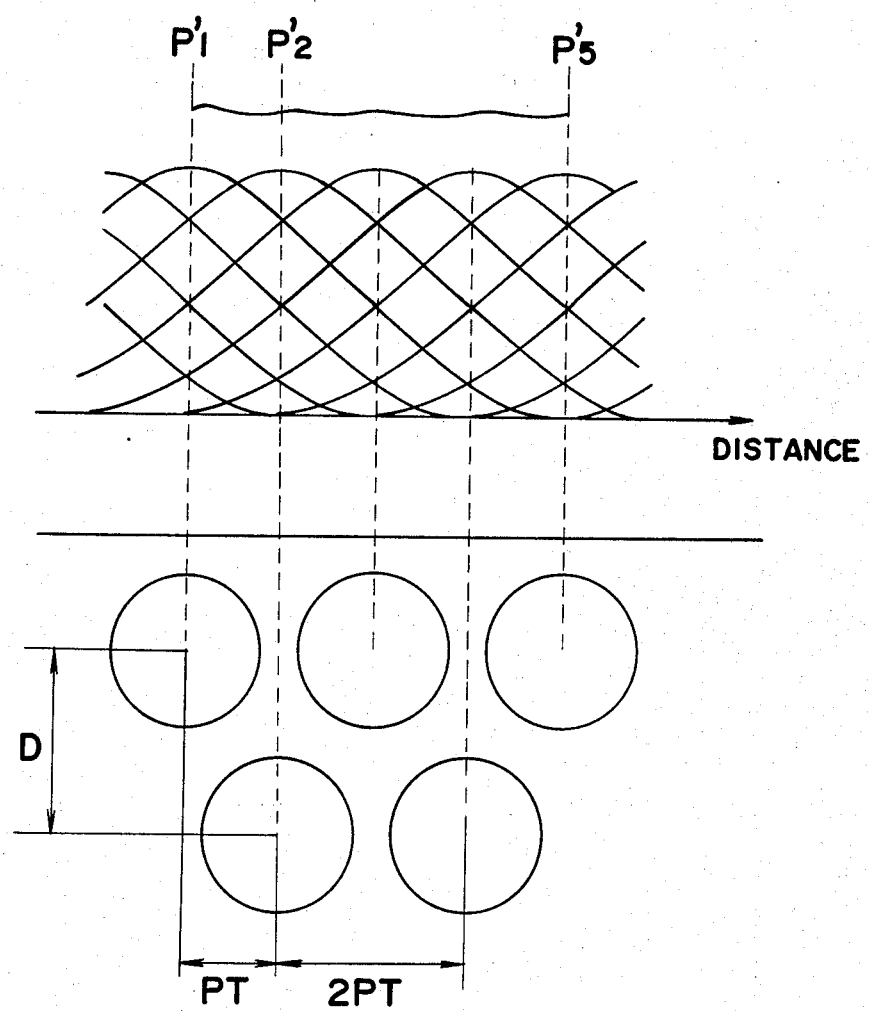
FIG. 16 is a diagram showing the distribution curves of exposure, taken in the longitudinal direction of the slit, for several lenses in the projection system according to the present invention.

The plural lenses of FIG. 13 may be arranged in one or more rows, for example, two rows as shown in FIG. 10 to manufacture a projection system according to the present invention. In this case, the lenses are arranged, as shown in FIG. 16, in two rows extending in the longitudinal direction of a scanning slit (not shown) and in such a way that the second row is shifted by a distance, PT, equal to one-half of the distance, 2PT, between the parallel optical axes of any neighbouring two lenses in the first row. The distance, D, between the centers of two rows may take any value in proportion to the width of the slit. FIG. 16 shows also the distribution of light exposure on the image plane C that was obtained by scanning the object plane with the projection system of FIG. 16. From this figure it can be seen that seven or eight lenses contribute to the formation of any point of the image points $P_1'$, $P_2'$ ... $P_5'$ in the image plane C and that the exposure is approximately constant all over the image plane C.

Figure 17:
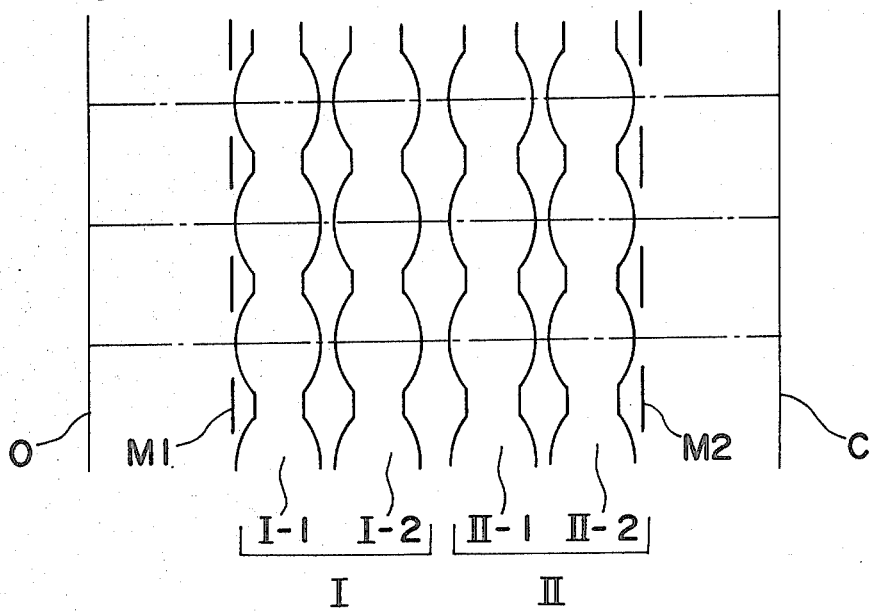
FIG. 17 is a schematic sectional view of still another form of a projection system embodying the present invention.

FIG. 17 shows another form of the projection system according to the present invention comprising four lenticular sheets arranged one after the other. Each of the sheets comprises a plurality of lenticular elements I-1, I-2, II-1 or II-2 arranged in two rows as shown in FIG. 16.

The projection system of FIG. 17 was assembled in the same manner as mentioned above by using four lenticular sheets made of acrylic resin, of which lens design parameters are set forth in Table 3.

TABLE 3

| radius of curvature (mm) | axial distance (mm) | refractive index (for the e line) | material |
|---|---|---|---|
| $r_1$ 2.092 | | | |
| | $d_1$ 2.5 | $N_1$ 1.493 | acrylic resin |
| $r_2$ −2.092 | | | |
| | $d_2$ 0.6 | | |
| $r_3$ 2.092 | | | |
| | $d_3$ 2.5 | $N_2$ 1.493 | acrylic resin |
| $r_4$ −2.092 | | | |
| | $d_4$ 0.5 | | |
| $r_5$ 2.092 | | | |
| | $d_5$ 2.5 | $N_3$ 1.493 | acrylic resin |
| $r_6$ −2.092 | | | |
| | $d_6$ 0.6 | | |
| $r_7$ 2.092 | | | |
| | $d_7$ 2.5 | $N_4$ 1.493 | acrylic resin |
| $r_8$ −2.092 | | | |

The mask $M_1$ was placed in front of the first refracting surface $r_1$ at a distance of 0.2 mm, while the mask $M_2$ was placed at the back of the eighth refracting surface $r_8$ at a distance of 0.2 mm. The effective aperture of the masks is 1.0 mm in diameter.

The effective F number of the above projection system is 3.3, and the track length between the object and image planes is 20.3 mm. The projection system possessed good optical performance and the evenness of exposure on the image plane was a few percent.

What I claim is:

1. An optical projection system of unit magnification for transmitting a real erect image of an object from an object plane to an image plane, that comprises a plurality of lenses with parallel optical axes and being arranged in one or more rows, each of said lenses comprising three lens elements arranged along a common optical path extending between the object and image planes, the first lens element nearer to the object plane being adapted to form an inverted intermediate image upon an intermediate image plane, the second lens element being arranged at or near the intermediate plane to prevent the lens from experiencing the loss of light rays, the third element nearer to the image plane being adapted to transmit and invert the intermediate image on the image plane, characterized in that each of said lenses includes two aperture masks which subtend light rays from the axial and off-axis object points in the object plane, one of said aperture masks being arranged between the first and second lens elements and at a position closer to the first lens element and farther from the second lens element, the other mask being arranged between the second and third lens elements and at a position closer to the third lens element and farther from the second lens element.

2. The optical projection system according to claim 1 wherein the lenses have a magnification of a intermediate image ranging from −0.25× to −0.6×.

3. The optical projection system according to claim 1 wherein said lenses are constructed by three lenticular sheets, each of which includes a plurality of lenticular elements arranged in one or more rows.

4. The optical projection system according to claim 1 wherein all the refracting surfaces of all the lenses have numerically equal radii of curvature.

5. The optical projection system according to claim 1 wherein the lenses are arranged in two or more parallel rows so that the lenses in one row are shifted by a distance equal to one-half of the distance between the neighboring optical axes of any two of the lenses in the neighboring row.

6. An optical projection system of unit magnification for transmitting an erect real image from an object plane to an image plane, comprising a plurality of lenses having parallel optical axes and being arranged in one or more rows, each of said lenses comprising four lens elements arranged along a common optical path extending between the object and image planes, said lens elements being classified into two groups which are symmetric with respect to an intermediate image plane, the first group consisting of two lens elements on the side of the object plane and forming a real inverted intermediate image of the object on the intermediate plane, the second group consisting of the remaining two lens elements on the side of the image plane and transmitting and inverting the intermediate image on the image plane, each of said lenses including at least two aperture masks which subtend light rays from the axial and off-axis object points in the object plane, one of said aperture masks being arranged within the first group of lens elements, the other being arranged within the second group of lens elements.

7. The optical projection system according to claim 6 wherein said lenses have a magnification of an intermediate image ranging from $-0.3\times$ to $-0.7\times$.

8. The optical projection system according to claim 6 wherein said lenses are constructed by three lenticular sheets, each of which includes a plurality of lenticular elements arranged in one or more rows.

9. The optical projection system according to claim 6 wherein all the refracting surfaces of all the lenses have numerically equal radii of curvature.

10. The optical projection system according to claim 6 wherein the lenses are arranged in two or more parallel rows so that the lenses in one row are shifted by a distance equal to one-half of the distance between the neighboring optical axes of any two of the lenses in the neighboring row.

11. An optical projection system of unit magnification for transmitting an erect real image from an object plane to an image plane, comprising a plurality of lenses arranged in one or more rows with parallel optical axes, each of said lenses comprising four lens elements arranged along a common optical path extending between the object and image planes, said lens elements being classified into two groups which are symmetric with respect to an intermediate plane, the first group consisting of two lens elements on the side of the object plane and forming a real inverted image of the object on the intermediate plane, the second group consisting of the remaining two lens elements on the side of the intermediate image plane and transmitting and inverting the intermediate image on the image plane, each of said lenses including two aperture masks which subtend light rays from the axial and off-axis object points, one of said aperture mask being arranged in front of the first group of lens elements, the other mask being arranged at the back of the second group of lens elements.

12. The optical projection system according to claim 11 wherein said lenses have a magnification of an intermediate image ranging from $-0.35\times$ to $-0.7\times$.

13. The optical projection system according to claim 11 wherein said lenses are constructed by three lenticular sheets, each of which includes a plurality of lenticular elements arranged in one or more rows.

14. The optical projection system according to claim 11 wherein all the refracting surfaces of all the lenses have numerically equal radii of curvature.

15. The optical projection system according to claim 11 wherein the lenses are arranged in two or more parallel rows so that the lenses in one row are shifted by a distance equal to one-half of the distance between the neighboring optical axes of any two of the lenses in the neighboring row.

16. The optical projection system of claim 1 further comprising the following design parameters:

| radius of curvature (mm) | axial distance (mm) | refractive index (for the e line) | material |
|---|---|---|---|
| $r_1$ 6.253 | | | |
| | $d_1$ 3.0 | $N_1$ 1.493 | acrylic resin |
| $r_2$ $-6.253$ | | | |
| | $d_2$ 7.4 | | |
| $r_3$ 6.253 | | | |
| | $d_3$ 3.0 | $N_2$ 1.493 | acrylic resin |
| $r_4$ $-6.253$ | | | |
| | $d_4$ 7.4 | | |
| $r_5$ 6.253 | | | |
| | $d_5$ 3.0 | $N_3$ 1.493 | acrylic resin |
| $r_6$ $-6.253$ | | | |

17. The optical system of claim 11 further comprising the following design parameters:

| radius of curvature (mm) | axial distance (mm) | refractive index (for the e line) | material |
|---|---|---|---|
| $r_1$ 2.092 | | | |
| | $d_1$ 2.5 | $N_1$ 1.493 | acrylic resin |
| $r_2$ $-2.092$ | | | |
| | $d_2$ 0.6 | | |
| $r_3$ 2.092 | | | |
| | $d_3$ 2.5 | $N_2$ 1.493 | acrylic resin |
| $r_4$ $-2.092$ | | | |
| | $d_4$ 0.5 | | |
| $r_5$ 2.092 | | | |
| | $d_5$ 2.5 | $N_3$ 1.493 | acrylic resin |
| $r_6$ $-2.092$ | | | |
| | $d_6$ 0.6 | | |
| $r_7$ 2.092 | | | |
| | $d_7$ 2.5 | $N_4$ 1.493 | acrylic resin |
| $r_8$ $-2.092$ | | | |

18. The optical projection system of claim 11 further comprising the following design parameters:

| radius of curvature (mm) | axial distance (mm) | refractive index (for the e line) | material |
|---|---|---|---|
| $r_1$ 8.99 | | | |
| | $d_1$ 3.0 | $N_1$ 1.493 | acrylic resin |
| $r_2$ $-8.99$ | | | |
| | $d_2$ 6.0 | | |
| $r_3$ 8.99 | | | |
| | $d_3$ 3.0 | $N_2$ 1.493 | acrylic resin |
| $r_4$ $-8.99$ | | | |
| | $d_4$ 7.6 | | |
| $r_5$ 8.99 | | | |
| | $d_5$ 3.0 | $N_3$ 1.493 | acrylic resin |
| $r_6$ $-8.99$ | | | |
| | $d_6$ 6.0 | | |
| $r_7$ 8.99 | | | |
| | $d_7$ 3.0 | $N_4$ 1.493 | acrylic resin |
| $r_8$ $-8.99$ | | | |

* * * * *

UNITED STATES PATENT OFFICE
CERTIFICATE OF CORRECTION

Patent No. 4,474,459        Dated October 2, 1984

Inventor(s) Hisashi Tokumaru

It is certified that error appears in the above-identified patent and that said Letters Patent are hereby corrected as shown below:

Column 4, line 41, after "in" delete "the" and insert --a--.

Column 14, line 18, after "optical" insert --projection--.

Signed and Sealed this

Eighth Day of July 1986

[SEAL]

Attest:

DONALD J. QUIGG

Attesting Officer    Commissioner of Patents and Trademarks